(12) United States Patent
Eustice et al.

(10) Patent No.: US 9,989,969 B2
(45) Date of Patent: Jun. 5, 2018

(54) VISUAL LOCALIZATION WITHIN LIDAR MAPS

(71) Applicant: THE REGENTS OF THE UNIVERSITY OF MICHIGAN, Ann Arbor, MI (US)

(72) Inventors: Ryan M. Eustice, Ann Arbor, MI (US); Ryan W. Wolcott, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days. days.

(21) Appl. No.: 15/000,169

(22) Filed: Jan. 19, 2016

(65) Prior Publication Data

US 2016/0209846 A1 Jul. 21, 2016

Related U.S. Application Data

(60) Provisional application No. 62/104,915, filed on Jan. 19, 2015.

(51) Int. Cl.
*G06K 9/00* (2006.01)
*G05D 1/02* (2006.01)
*G06T 7/73* (2017.01)

(52) U.S. Cl.
CPC ......... *G05D 1/0246* (2013.01); *G05D 1/0248* (2013.01); *G05D 1/0274* (2013.01); *G06T 7/74* (2017.01); *G05D 2201/0213* (2013.01); *G06T 2207/10028* (2013.01); *G06T 2207/30244* (2013.01); *G06T 2207/30248* (2013.01)

(58) Field of Classification Search
CPC ......................... A61B 5/18; B60R 21/01538
See application file for complete search history.

(56) References Cited

U.S. PATENT DOCUMENTS

| | | | |
|---|---|---|---|
| 7,015,831 B2 | 3/2006 | Karlsson et al. |
| 8,024,072 B2 | 9/2011 | Park et al. |
| 8,280,623 B2 | 10/2012 | Trepagnier et al. |
| 8,301,374 B2 | 10/2012 | Surampudi et al. |
| 8,364,334 B2 | 1/2013 | Au et al. |
| 8,473,144 B1 | 6/2013 | Dolgov et al. |

(Continued)

FOREIGN PATENT DOCUMENTS

WO 2013/0150286 A1 10/2013

OTHER PUBLICATIONS

Davison et al. ("MonoSLAM: Real-Time Single Camera Slam", IEEE Transactions on Pattern Analysis and Machine Intelligence, vol. 29, No. 6, Jun. 2007, pp. 1052-1067).*

*Primary Examiner* — Duy M Dang
(74) *Attorney, Agent, or Firm* — Harness, Dickey & Pierce, P.L.C.

(57) ABSTRACT

An apparatus and method for visual localization of a visual camera system outputting real-time visual camera data and a graphics processing unit receiving the real-time visual camera data. The graphics processing unit accesses a database of prior map information and generates a synthetic image that is then compared to the real-time visual camera data to determine corrected position data. The graphics processing unit determines a camera position based on the corrected position data. A corrective system for applying navigation of the vehicle based on the determined camera position can be used in some embodiments.

7 Claims, 12 Drawing Sheets

(56) References Cited

U.S. PATENT DOCUMENTS

| | | |
|---|---|---|
| 8,612,135 B1 | 12/2013 | Montemerlo et al. |
| 8,711,206 B2 | 4/2014 | Newcombe et al. |
| 8,798,357 B2 | 8/2014 | Sinha et al. |
| 2007/0003107 A1 | 1/2007 | Wei et al. |
| 2008/0033645 A1 | 2/2008 | Levinson et al. |
| 2008/0103699 A1* | 5/2008 | Hanna .................... G01C 11/00 |
| | | 702/5 |
| 2009/0030605 A1 | 1/2009 | Breed |
| 2010/0076642 A1 | 3/2010 | Hoffberg et al. |
| 2012/0140061 A1* | 6/2012 | Zeng .................... G01S 13/726 |
| | | 382/103 |
| 2012/0300020 A1 | 11/2012 | Arth et al. |
| 2013/0032524 A1 | 2/2013 | Dragna |
| 2013/0054029 A1* | 2/2013 | Huang .................... B25J 5/005 |
| | | 700/259 |
| 2013/0211656 A1 | 8/2013 | An et al. |
| 2014/0206443 A1 | 7/2014 | Sharp et al. |
| 2014/0249752 A1 | 9/2014 | Napier et al. |

* cited by examiner

Fig-6A (a) Typical Observation, Unaffected by Dynamic Obstacles

Fig-6B (b) Negative Correlation Captured (Bright Tar Strips in Imagery Aligns With Dark in Prior Map)

Fig-6C (c) Our Method Demonstrates Robustness to Shadows

*Fig-7A* (a) Our Method is Not Robust to All Dynamic Obstacles, as Shown in the Figure

*Fig-7B* (b) Poor Imagery Relative to Prior Map Prevents Registration

*Fig-7C* (c) Only Constrained Laterally by Double Lane Marker

VISUAL LOCALIZATION WITHIN LIDAR MAPS

CROSS-REFERENCE TO RELATED APPLICATIONS

This application claims the benefit of U.S. Provisional Application No. 62/104,915, filed on Jan. 19, 2015. The entire disclosure of the above application is incorporated herein by reference.

FIELD

The present disclosure relates to visual localization and, more particularly, relates to visual localization within LIDAR maps using correlated real-time visual images.

BACKGROUND AND SUMMARY

This section provides background information related to the present disclosure which is not necessarily prior art. This section provides a general summary of the disclosure, and is not a comprehensive disclosure of its full scope or all of its features.

I. INTRODUCTION

In recent years, fully autonomous, self-driving cars have grown into a reality with progress in the simultaneous localization and mapping (SLAM) research community and the advent of consumer-grade three-dimensional (3D) light detection and ranging (LIDAR) scanners. Systems such as the Google driverless car use these LIDAR scanners, combined with high accuracy GPS/INS systems, to enable cars to drive hundreds of thousands of miles without user control.

In order to navigate autonomously, these robots require precise localization within an a priori known map. Rather than using the vehicle's sensors to explicitly perceive lane markings, traffic signs, etc., metadata is embedded into a prior map, which transforms the difficult perception tasks into a localization problem. State-of-the-art methods use reflectivity measurements from 3D LIDAR scanners to create an orthographic map of ground-plane reflectivities. Online localization is then performed with the current 3D LIDAR scans and an inertial measurement unit (IMU).

The cost of 3D LIDAR scanners is prohibitive for consumer grade automobiles. Quite likely the greatest near-term enabler for self-driving cars is the increased use of camera systems in place of expensive LIDAR scanners. Cameras provide a low-cost means to generate extremely rich, dense data that is suitable for localization.

The present teachings leverage a graphics processing unit (GPU) so that one can generate several synthetic, pin-hole camera images, which we can then directly compare against streaming vehicle imagery. This differs from other visual localization approaches, which rely on sophisticated feature points. This significantly simpler approach avoids over-engineering the problem by formulating a slightly more computationally expensive solution that is still real-time tractable on a mobile-grade GPU and capable of high accuracy localization.

According to the present teachings, 3D prior maps (augmented with surface reflectivities) constructed by a survey vehicle equipped with 3D LIDAR scanners are used for vehicle automation. A vehicle is localized by comparing imagery from a monocular camera against several candidate views, seeking to maximize normalized mutual information (NMI) (as outlined in FIG. 1). In some embodiments, contributions of the present teachings include:

A multi-modal approach that allows the use of LIDAR-based ground maps, which accurately depicts the metric and surface reflectivity of the ground.

A projective framework that can predict and evaluate appearance with a single, monocular camera.

Benchmarks of visual localization methods with state-of-the-art LIDAR-based localization strategies are provided.

A GPU implementation that can provide real-time localization at ~10 Hz is provided.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 3A-3C illustrate a sample ground mesh used to generate synthetic views of the environment.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Self-driving cars have become a frequent occurrence on roadways and are a certainty to become a consumer product in the near future. Systems such as the Google driverless car use these LIDAR scanners, combined with highly accurate GPS/INS systems, to enable cars to drive hundreds of thousands of miles without user control. However, one of the most significant road-blocks to autonomous vehicles is the prohibitive cost of the sensor suites necessary for localization.

Existing state-of-art methods use reflectivity measurements from 3D LIDAR scanners which are often cost prohibitive for consumer grade automobiles. On the other hand, cameras provide a low-cost means to generate extremely rich, dense data that is suitable for localization. Quite likely the greatest near-term enabler for self-driving cars is the increased use of camera systems in place of expensive LIDAR scanners. Therefore, capitalizing on efficient use of camera systems for autonomous driving can have important impact on the autonomous driving vehicles market which is expected to have 3 million automated vehicles by 2025.

Next-Generation Automated Driving Platform research of the present teachings has enabled precise, lane-level localization supportive of automated driving or active-safety applications by using commodity cameras. The position of the vehicle is corrected to centimeter-level accuracy using map matching of live camera imagery to a 3D prior map information. The proposed method leverages a graphics processing unit (GPU) so that several synthetic, pin-hole camera images can be generated, which can then be directly compared against streaming vehicle imagery. This significantly simpler approach avoids over-engineering the problem by formulating a slightly more computationally expensive solution that is still real-time tractable on a mobile-grade GPU and capable of high accuracy localization. Results from experiments with 3.0 km and a 1.5 km trajectories show that the proposed GPU implementation approach can provide real-time localization at ~10 Hz. Benchmarks with the state-of-art LIDAR-only automated vehicle localization have proven that the proposed technology's ability to use cameras for live sensor data represents a low-cost solution for achieving precise, lane level localization with an error rate of similar order of magnitude.

II. RELATED WORK

Early visual SLAM methodologies employ filtering frameworks in either an extended Kalman filter (EKF) or FastSLAM framework, to generate a probability distribution over the belief pose and map of point features. In order to accurately localize within these point feature maps, one relies on co-observing these features. However, these features frequently vary with time of day and weather conditions, and cannot be used without an intricate observability model.

In the context of autonomous vehicles, Wu and Ranganathan try to circumvent this by identifying and extracting higher fidelity features from road markings in images that are far more robust and representative of static infrastructure. Their method is able to densely and compactly represent a map by using a sparse collection of features for localization. However, their method assumes a flat ground, whereas our projective registration allows for more complex ground geometries and vertical structures.

Rather than relying on specific image features in our prior map (and complicated, hand-tuned feature extractors), our method is motivated by the desire to circumvent point features entirely and do whole image registration onto a static, 3D map captured by survey vehicles.

In work by Stewart and Newman, the use of a 3D map for featureless camera-based localization that exploits the 3D structure of the environment was explored. They were able to localize a monocular camera by minimizing normalized information distance between the appearance of 3D LIDAR points projected into multiple camera views. Further, McManus et al. used a similar 3D map with reflectivity information to generate synthetic views for visual distraction suppression.

This approach has been previously considered, but methods thus far rely on the reconstruction of the local ground plane from a stereo camera pair. Senlet and Elgammal create a local top-view image from a stereo pair and use chamfer matching to align their reconstruction to publicly available satellite imagery. Similarly, Napier and Newman use mutual information to align a live camera stream to pre-mapped local orthographic images generated from the same stereo camera. With both of these methods, small errors in stereo pair matching can lead to oddly distorted orthographic reconstructions, thus confusing the localization pipeline. Further, our multi-modal approach allows us to take advantage of LIDAR scanners to actively capture the true reflectivity of our map, meaning our prior map is not susceptible to time of day changes in lighting and shadows.

The use of mutual information for multi-modal image registration has been widely used in the medical imaging domain for several decades. More recently, the idea has been transferred to robotics for calibration of visual cameras to LIDAR scanners. This sensor registration has mostly been considered an offline task due to the expense of generating synthetic views for calibration.

To move this into real-time localization, we propose using a GPU to generate synthetic views, which we can then use a normalized measure of mutual information to optimize over our vehicle's pose. The GPU has been frequently used in robot localization for precisely this reason, including: Kinect depth-SLAM, image feature correspondence search for SIFT features, and line features.

II. PRIOR MAP

The first part of our localization framework is the offline mapping stage, which generates the map to be used for online localization. Our goal here is to generate a map that is metrically accurate to the surrounding structure. Prior to the offline mapping stage, our survey vehicle has no a priori knowledge of the environment, thus, we employ SLAM to build a model of the environment.

Figure 2:
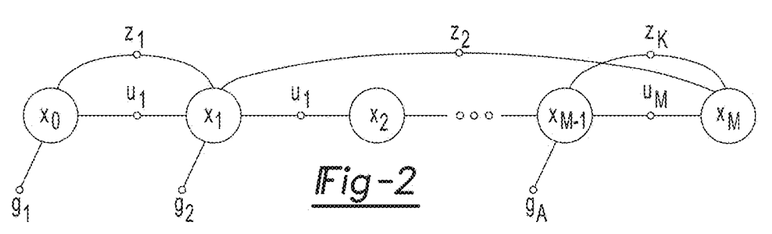
FIG. 2 is a factor graph of the pose-graph SLAM problem that we solve in the off-line mapping stage to develop a prior map for localization.

We use the state-of-the-art in nonlinear least-squares, pose-graph SLAM and measurements from our survey vehicle's 3D LIDAR scanners to produce a map of the 3D structure in a self-consistent frame. We construct a pose-graph to solve the full SLAM problem, as shown in FIG. 2, where nodes in the graph are poses (X) and edges are either odometry constraints (U), laser scan-matching constraints (Z), or GPS prior constraints (G). These constraints are modeled as Gaussian random variables; resulting in a non-linear least-squares optimization problem that we solve with the incremental smoothing and mapping (iSAM) algorithm.

Since map construction is an offline task, we do not have to construct our pose-graph temporally. Instead, we first construct a graph with only odometry and global positioning system (GPS) prior constraints. With this skeleton pose-graph in the near vicinity of the global optimum, we use Segal et al.'s generalized iterative closest point (GICP) to establish 6-degree of freedom (DOF) laser scan-matching constraints between poses; adding both odometry constraints (temporally neighboring poses) and loop closure constraints (spatially neighboring poses) to our pose-graph. Moreover, we augment our GPS prior constraints with an artificial height prior (z=0) to produce a near-planar graph.

Constraining the graph to a plane simplifies localization to a 3-DOF search over x, y, and θ.

Figure 3A:
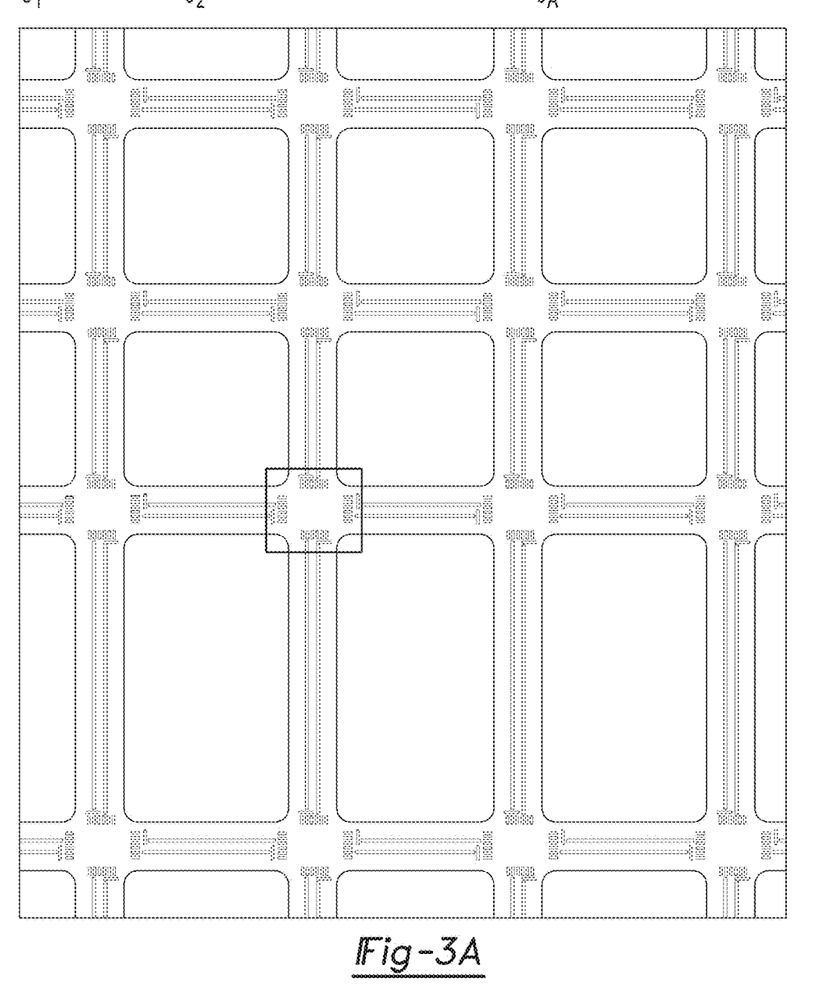
FIG. 3A shows a 400 m×300 m ground mesh colored by surface reflectivity, with a zoomed in view shown in FIG. 3B (this region is highlighted in red in FIG. 3A)). We show the same zoomed view, colored by z-height to demonstrate the height variation we are able to capture with our ground-mesh in FIG. 3C—yellow-to-red represents $\Delta z = 30$ cm.
Figure 3B:
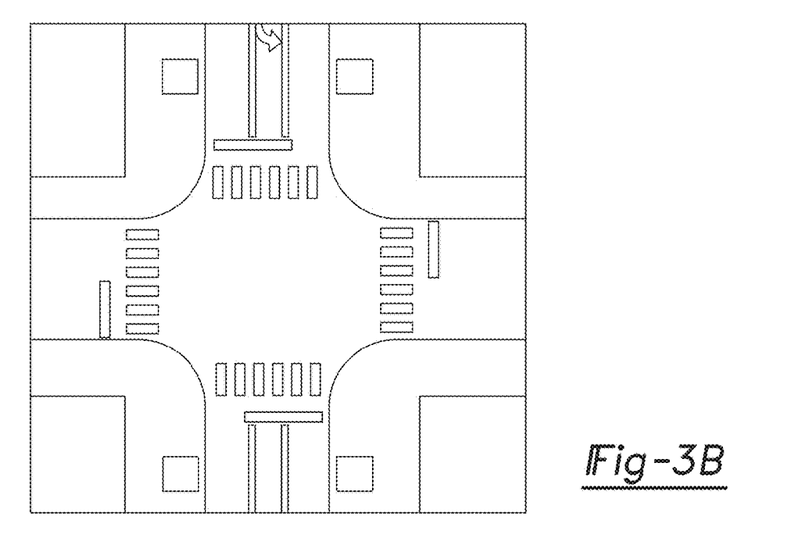
Figure 3C:
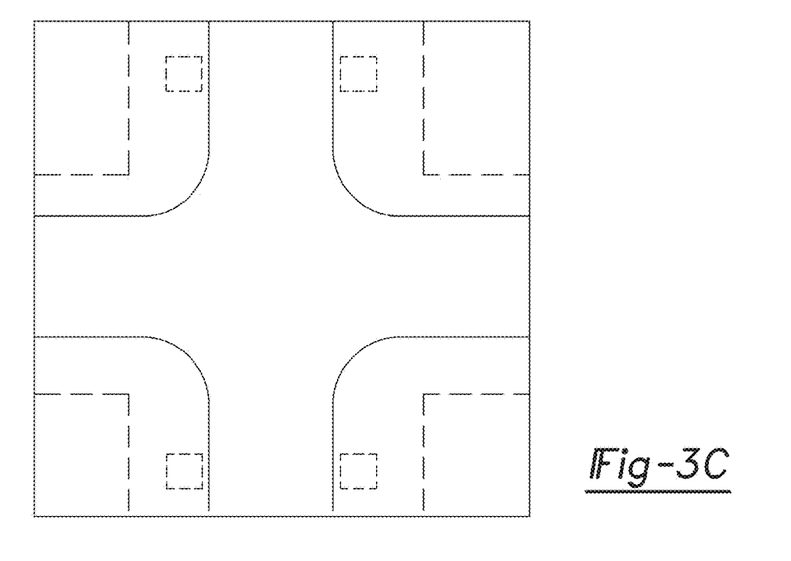

From the optimized pose-graph, we construct a dense ground-plane mesh using Algorithm 1. Our algorithm is logically equivalent to extracting the ground-plane at each pose and draping an orthographic texture over a varying z-height map. A sample prior map can be seen in FIG. 3.

---

Algorithm 1 Pose-Graph to Ground-Mesh

Input: Optimized pose-graph, $G = \{x_0, x_1, ... x_{M-1}, x_M\}$
Output: Triangle ground-mesh, $T = \{t_0, ..., t_N\}$
1: Initialize 10 cm sparse grid, grid
2: for $x_i$ in G do
3:     // Extract ground point cloud ($p_j$ and $r_j$ correspond to
4:     // metric location and reflectivity, respectively)
5:     $\{\{p_0, ... p_n\} \{r_0, ... r_n\}\} = \text{ExtractGround}(x_i)$
6:
7:     // Drop extracted ground points into surface grid
8:     for j = 0 → n do
9:         Add $\{p_j, r_j\}$ to running mean at grid $[p_j]$
10:    end for
11: end for
12: Spatially connect grid to form 10 cm triangle mesh, T

---

Note that our system is not limited to ground-only maps. We originally intended to incorporate the full 3D structure in our prior map, including buildings, street poles, etc., but found that the added structure did not appreciably increase registration quality enough to warrant the additional rendering cost (the 3D structure doubled scene prediction time). However, we did find that it was extremely important to use a mesh-surface as opposed to a strict planar texture because the planar texture did not accurately depict the curvature of the road (e.g., gutters sunken), as can be seen in the map colored by z-height in FIG. 3C.

IV. PROJECTIVE IMAGE REGISTRATION

The goal of our image registration problem is to, given some initial pose prior $x_k$, find some relative offset $\Delta x_i$ that optimally aligns the projected map, $P_i$, against our camera measurements, $C_k$. This optimization is framed as a local search problem within the vicinity of $x_k$ and could be done in a brute-force manner by generating a predicted view for the entire dom(x)×dom(y)×dom(θ) search volume to avoid local maxima of hill-climbing searches. The remainder of this section details our method for generating these predicted views ($P_i$) and our NMI evaluation metric.

A. Generating Predicted Views

Given a query camera pose parameterized as [R|t], where R and t are the camera's rotation and translation, respectively, our goal is to provide a synthetic view of our world from that vantage point. We Use OpenGL, which is commonly used for visualization utilities, in a robotics context to simulate a pin-hole camera model.

All of our ground-mesh triangles are drawn in a world frame using indexed vertex buffer objects. These triangles are incrementally passed to the GPU as necessary as the robot traverses the environment—though the maps in our test set can easily fit within GPU memory. We pass the projection matrix, $$P = M \cdot K \cdot \begin{bmatrix} R & t \\ 0 & 1 \end{bmatrix} \quad (1)$$

to our OpenGL Shading Language (GLSL) vertex shader for transforming world vertex coordinates to frame coordinate. Here, $$M = \begin{bmatrix} \frac{2}{w} & 0 & 0 & -1 \\ 0 & -\frac{2}{h} & 0 & 1 \\ 0 & 0 & -\frac{2}{z_f - z_n} & -\frac{z_f + z_n}{z_f - z_n} \\ 0 & 0 & 0 & 1 \end{bmatrix} \text{ and} \quad (2)$$

$$K = \begin{bmatrix} f_x & \alpha & -c_x & 0 \\ 0 & f_y & -c_y & 0 \\ 0 & 0 & z_f + z_n & z_f \times z_n \\ 0 & 0 & -1 & 0 \end{bmatrix} \quad (3)$$

where w and h are the image's width and height, $z_n$ and $z_f$ are the near and far clipping planes, and the elements of K correspond to the standard pinhole camera model. Note that the negative values in K's third column are the result of inverting the z-axis to ensure proper OpenGL clipping.

Figure 4:
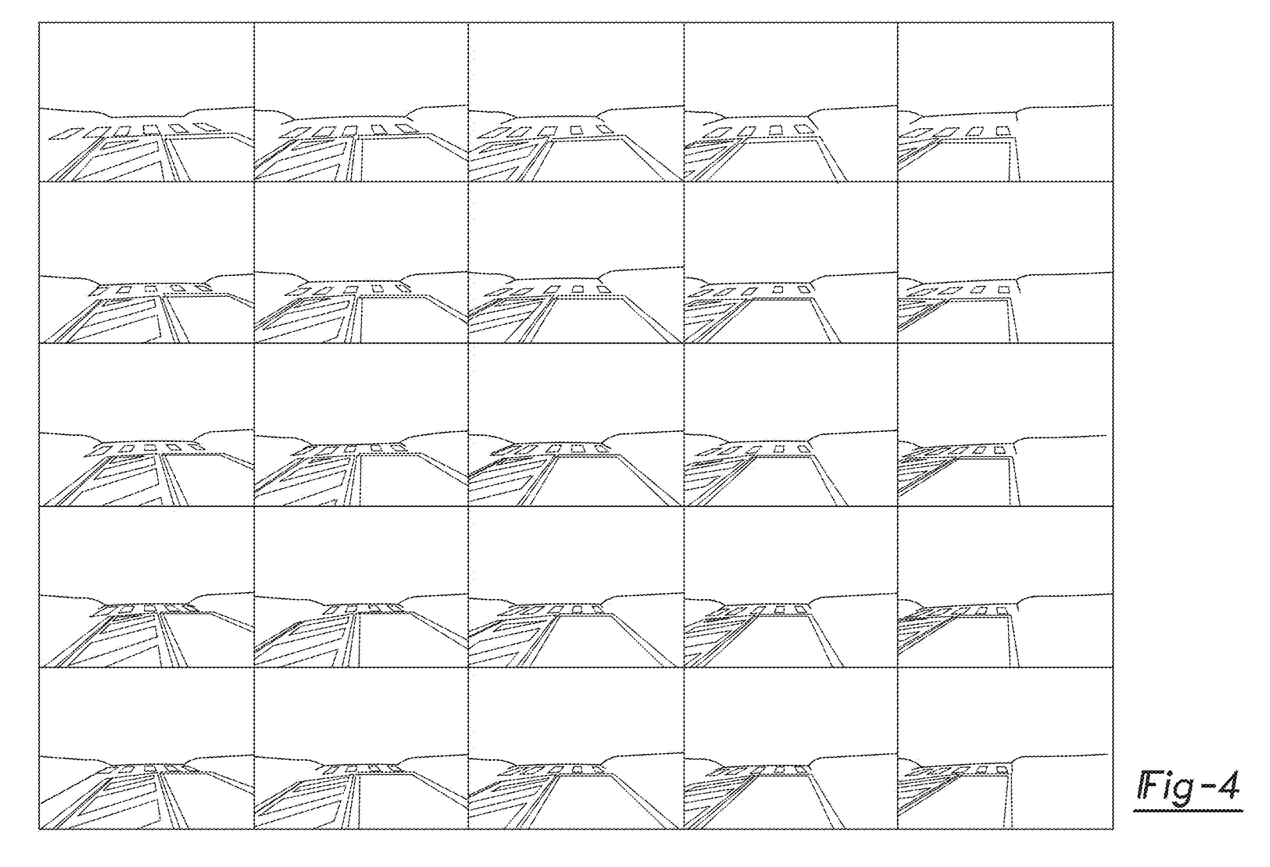
FIG. 4 are photos of sample synthetic views generated by our OpenGL pipeline.

For efficient handling of these generated textures, we render to an offscreen framebuffer that we then directly transfer into a CUDA buffer for processing using the CUDA-OpenGL interoperability. Sample synthetic views can be seen in FIG. 4.

B. Simplified Rotational Search

A naïve approach to this local search problem would be to use the OpenGL pipeline to generate a synthetic view for each discrete step within the search volume, dom(x)×dom(y)×dom(θ). However, this would result in generating $n_x \times n_y \times n_\theta$ synthetic views. Because the predicted view rasterization is the primary bottleneck of the system (taking nearly 1 ms for each render), here we propose an alternative method of pre-warping the camera measurement to explore the space (warpings can be performed at 0.1 ms instead and can be parallelized with the serial OpenGL rasterizations).

We can leverage the infinite homography, $H_\infty = KRK^{-1}$, and apply a bank of precomputed rotational mappings to the source image, $$u^f = KRK^{-1} u^i \quad (4)$$

Figure 5:
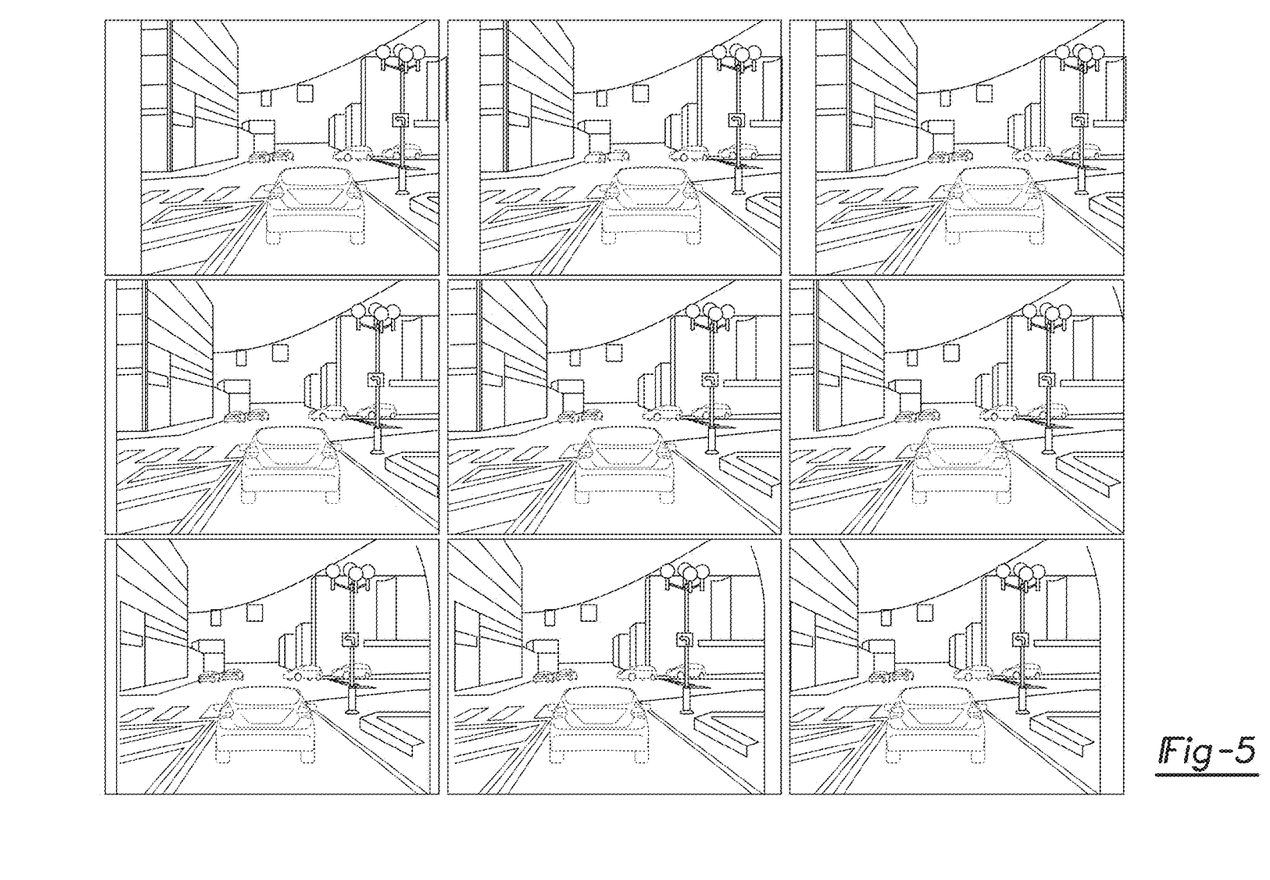
FIG. 5 are photos of sample pre-warping applied to images to reduce the overall search space for image registration.

This technique allows us to use the OpenGL pipeline to generate only $n_x \times n_y$ synthetic views, first, then compare each against $n_\theta$ (warped) measurements. We still evaluate the same number of candidate pairs, though we significantly reduce our OpenGL pipeline overhead. A sample of these rotations can be seen in FIG. 5.

C. Normalized Mutual Information Image Registration

Mutual information has been successfully used in various fields for registering data from multi-modal sources. Mutual information provides a way to statistically measure the mutual dependence between two random variables, A and B. Most commonly, mutual information is defined in terms of the marginal and joint entropies of each:

$$MI(A,B) = H(A) + H(B) - H(A,B) \quad (5)$$

where these entropies can be realized by evaluating the Shannon entropy over the random variables A and B:

$$H(A) = -\sum_{a \in A} p(a) \log p(a) \quad (6)$$

$$H(B) = -\sum_{b \in B} p(b) \log p(b) \quad (7)$$

$$H(A, B) = -\sum_{a \in A} \sum_{b \in B} p(a, b) \log p(a, b) \quad (8)$$

This mutual information formulation clearly demonstrates that maximization of mutual information is achieved through the minimization of the joint entropy of A and B. This optimality coincides with minimizing the dispersion of the two random variable's joint histogram.

Figure 6A:
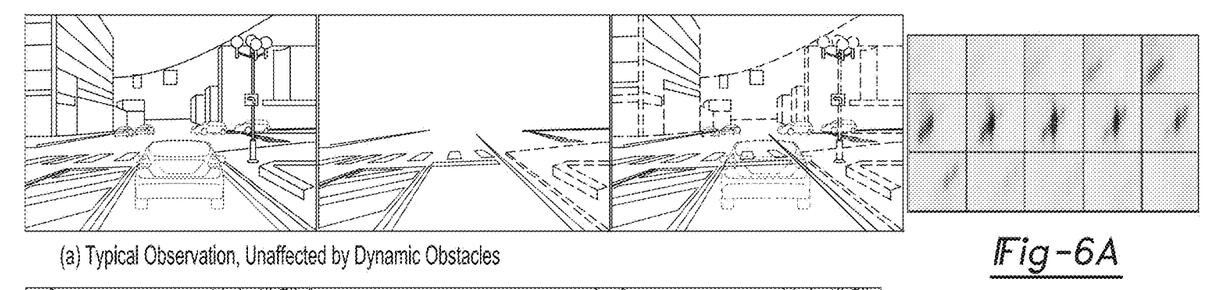
FIGS. 6A-6C are successful image registrations.
Figure 6B:
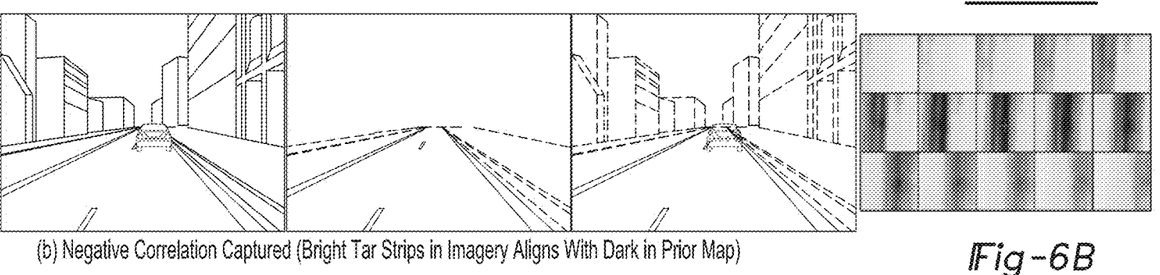
Figure 6C:
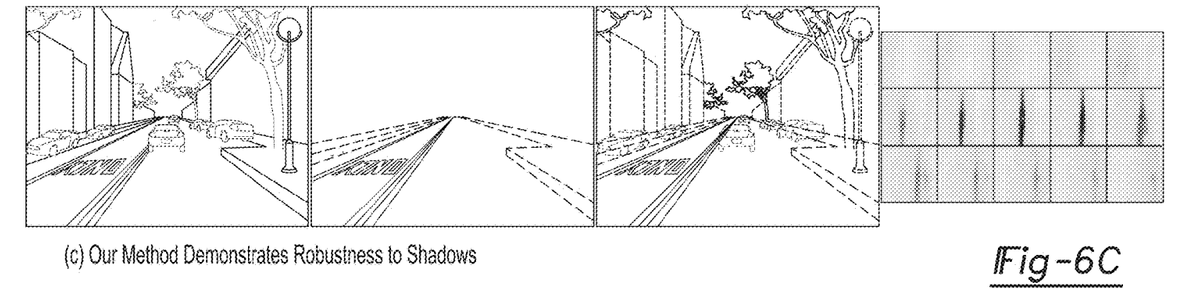

By viewing the problem in this information theoretic way, we are able to capture more interdependency between random variables than with simple similarity or correlation-based measures. For example, tar strips in the road frequently appear dark in LIDAR reflectivity, yet bright in visual imagery. Correlative methods can only measure either a negative or positive correlation and often fails under varying illumination. However, because maximization of mutual information is concerned with seeking tightly compact joint distributions, we can successfully capture this mutual dependence (see FIG. 6B). Note that it would be quite difficult to create a hand-tuned feature detector that could identify this type of information for localization.

Because our source imagery and predicted views have varying amount of overlap (largely due to our pre-warping technique), we instead employ a normalized mutual information measure. The amount of overlap between two candidate images can bias the standard mutual information measure toward lower overlap image pairs. To avoid these effects, Studholme et al. proposed an overlap invariant measure of mutual information, normalized mutual information (NMI):

$$NMI(A, B) = \frac{H(A) + H(B)}{H(A, B)} \quad (9)$$

This measure shares the same desirable qualities of the typical mutual information shown in (5), but is more robust to overlap changes.

In summary, our image registration amounts to the following optimization:

$$(\hat{x}_k, \hat{y}_k, \hat{\theta}_i) = \underset{(x_k, y_k, \theta_i)}{\operatorname{argmax}} \; NMI(C_i, P_k) \quad (10)$$

where θ spans the pre-warping of source imagery, $C_i$, and $\langle x_k, y_k \rangle$ explores the local search around our prior belief by generating synthetic views, $P_k$.

V. FILTERING FRAMEWORK

Our image registration is fairly agnostic to any particular filtering framework, so here we briefly present an Extended Kalman Filter (EKF) localization framework. Due to the near-planar surface model, we are able to treat localization as a 3-DOF optimization, with the state vector $\mu_k = \{x_k, y_k, \theta_k\}$.

We define a discrete time process model and incorporate only image registration corrections into our state filter.

Predict $\bar{\mu}_k F_{k-1} \mu_{k-1}$ $\Sigma_k = F_{k-1} \Sigma_{k-1} F_{k-1}^T + Q_{k-1}$ Update $K_k = \Sigma_k H_k^T (H_k \Sigma_k H_k^T + R_k)^{-1}$ $\mu_k = \bar{\mu}_k + K_k(z_k - h_k(\bar{\mu}_k))$ $\Sigma_k = (I - K_k H_k) \Sigma_k (I - K_k H_k)^T + K_k R_k K_k^T$ Here, $F_k$ represents our plant model that integrates measurements from an Applanix IMU with uncertainty $Q_{k-1}$, $H_k$ is a linear observation model (identity matrix), and $K_k$ is the corrective Kalman gain induced by our image registration measurement $z_k$ (with uncertainty $R_k$). The measurement $z_k$ is exactly the output of our image registration in (10) and $R_k$ is estimated by fitting a covariance to the explored cost surface.

Our filter is initialized in a global frame from a single dual-antenna GPS measurement with high uncertainty, which provides a rough initial guess of global pose with orientation. We adaptively update our search bounds to ensure that we explore a 3-σ window around our posterior distribution. This dynamic approach allows us to perform an expensive, exhaustive search to initially align to our prior map while avoiding local maxima, then iteratively reduce the search space as our posterior confidence increases. We restrict the finest search resolution to be 20 cm over ±1 m. Note that aside from using GPS for initializing the filter, this proposed localization method only uses input from inertial sensors, a wheel encoder, and a monocular camera.

VI. RESULTS

Figure 1:
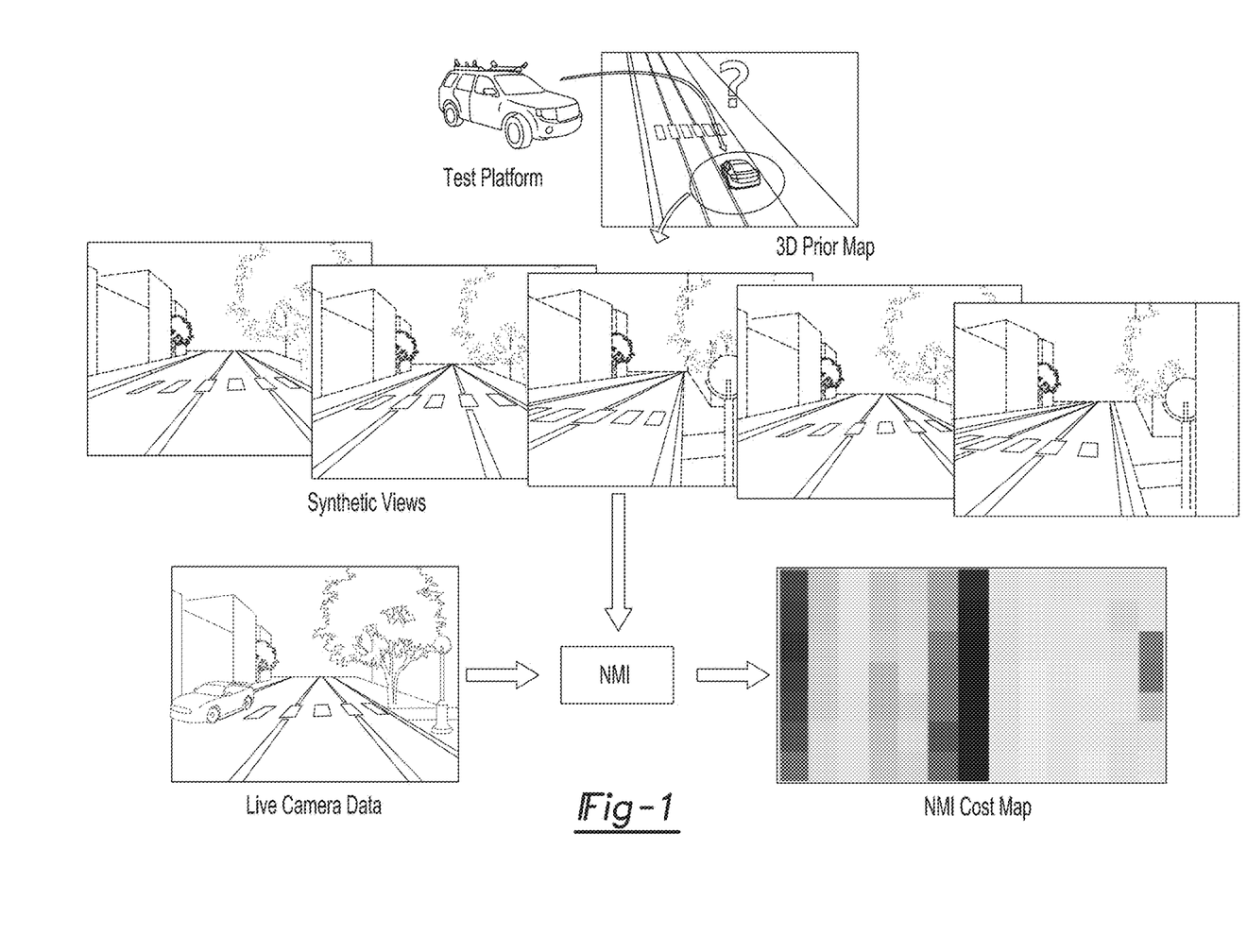
FIG. 1 illustrates an overview of our proposed visual localization system.

We evaluated our theory through data collected on our autonomous platform, a TORC ByWire XGV, as seen in FIG. 1. This automated vehicle is equipped with four Velodyne HDL-32E 3D LIDAR scanners, a single Point Grey Flea3 monocular camera, and an Applanix POS-LV 420 inertial navigation system (INS).

Algorithms were implemented using OpenCV, OpenGL, and CUDA and all experiments were run on a laptop equipped with a Core i7-3820QM central processing unit (CPU) and mid-range mobile GPU (NVIDIA Quadro K2000M).

In collecting each dataset, we made two passes through the same environment (on separate days) and aligned the two together using our offline SLAM procedure outlined in § III. This allowed us to build a prior map ground-mesh on the first pass through the environment. Then, the subsequent pass would be well localized with respect to the ground-mesh, providing sufficiently accurate ground-truth in the experiment (accuracy an order or magnitude greater than our localization errors). Experiments are presented on two primary datasets:

Downtown: 3.0 km trajectory through downtown Ann Arbor, Mich. in which multiple roads are traversed from both directions and the dataset contains several dynamic obstacles.

Stadium: 1.5 km trajectory around Michigan Stadium in Ann Arbor, Mich. This dataset presents a complicated environment for localization as half of the dataset is through a parking lot with infrequent lane markings.

A. Image Registration

Since our odometry source has significantly low drift-rates, image registration deficiencies can be masked by a well-tuned filtering framework. Thus, we first look directly at the unfiltered image registration within the vicinity of ground-truth results.

To evaluate our image registration alone, we took our ground truth pose belief over the Downtown dataset and tried to perform an image registration to our map once a second. Ideally, we should be able to perfectly register our prior map, however, due to noise or insufficient visual variety in the environment, we end up with a distribution of lateral and longitudinal errors.

Figure 8A:
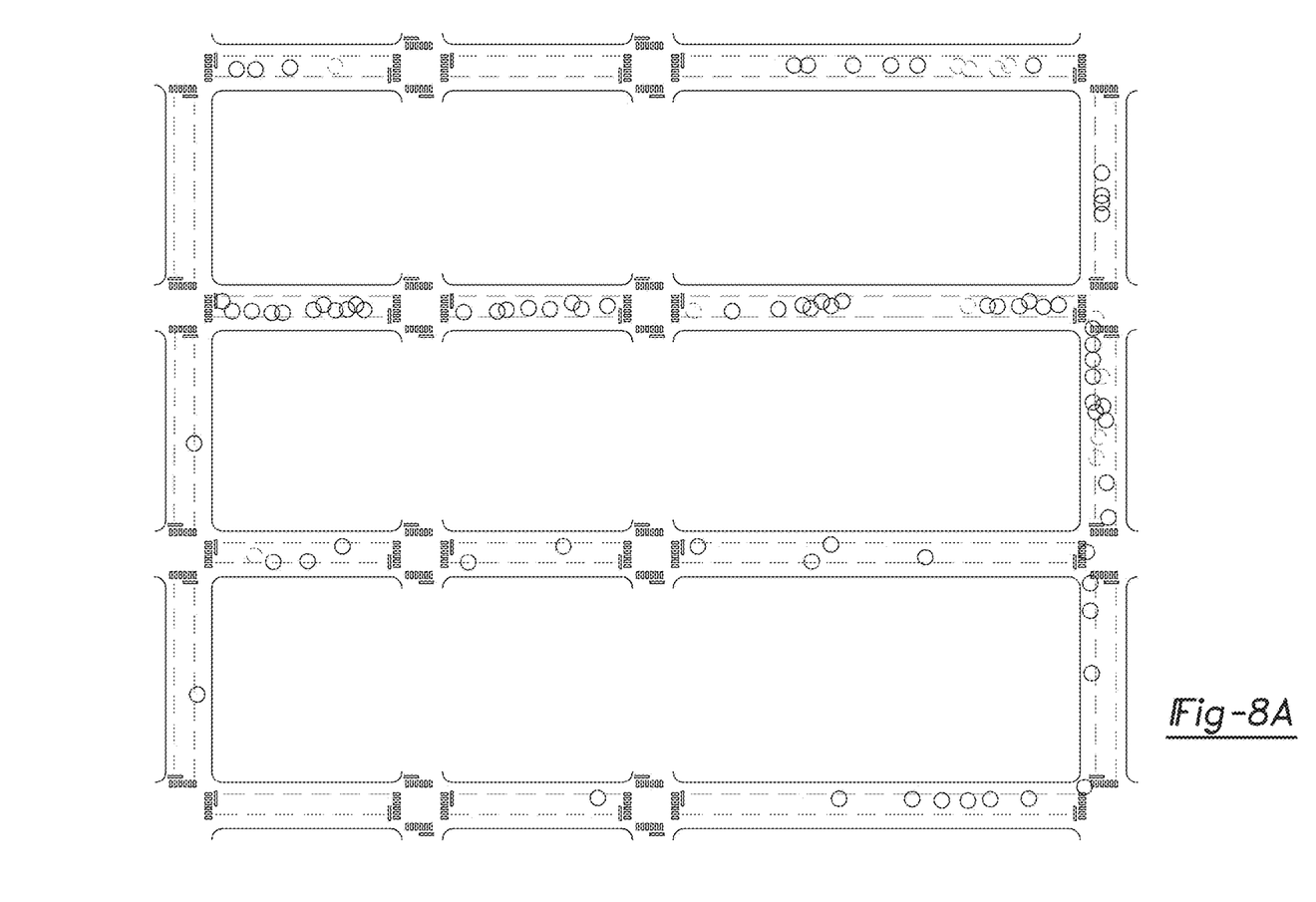
FIGS. 8A-8B are longitudinal and lateral errors in our image registration, sampled at each second of our trajectory; larger and brighter markers indicate regions where image registration produced higher errors longitudinally (FIG. 8A) or laterally (FIG. 8B).
Figure 8B:
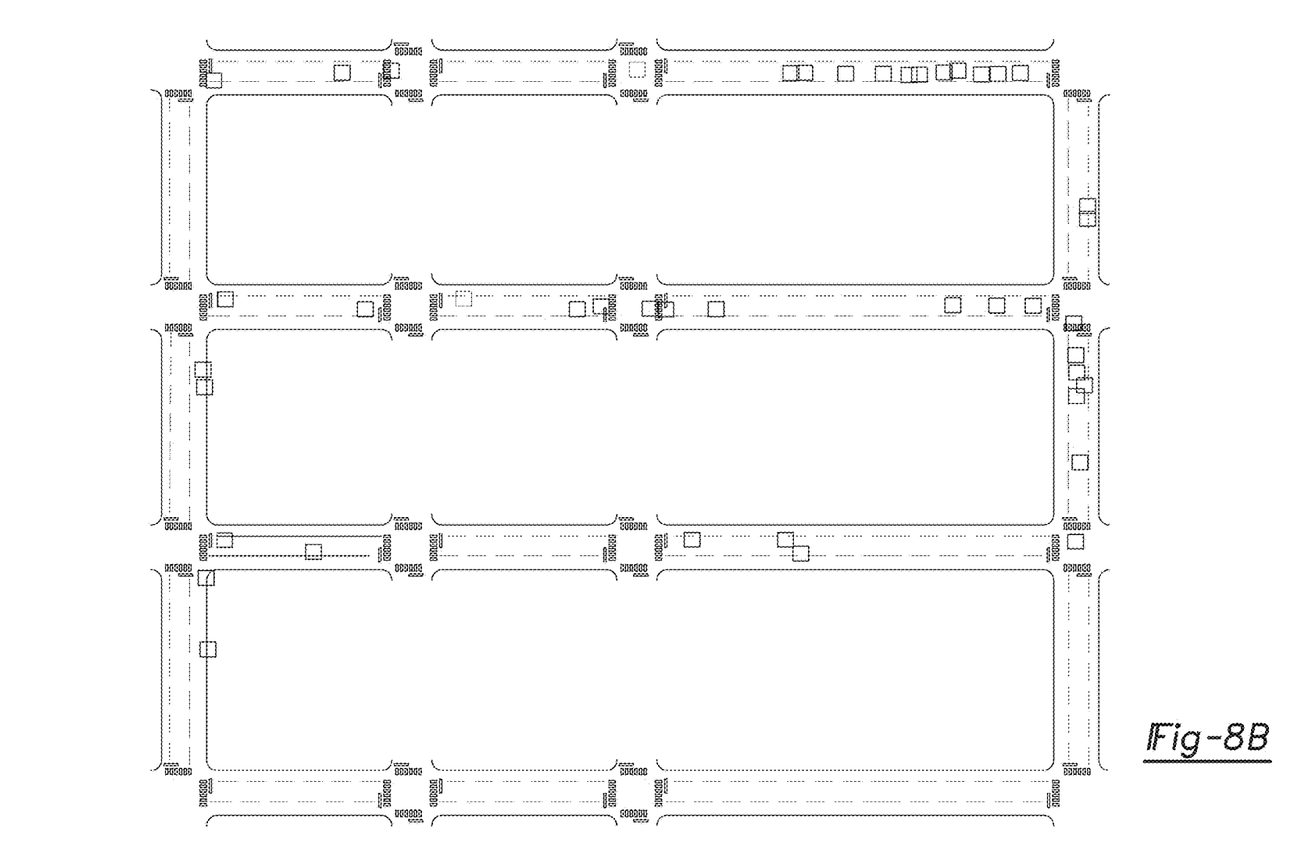

We present these results in two ways. First, we show our vehicle's trajectory through the prior map in which we color our longitudinal and lateral errors at each ground-truth pose, shown in FIG. 8. In this figure, larger and brighter markers indicate a larger error in registration at that point. One can immediately notice that we are not perfectly aligned longitudinally on long, straight stretches; during these stretches, the system frequently relies on a double, solid lane marking to localize off of. To maintain accuracy, the system requires occasional cross-streets, which provide more signal for constraining our pose belief.

Figure 9:
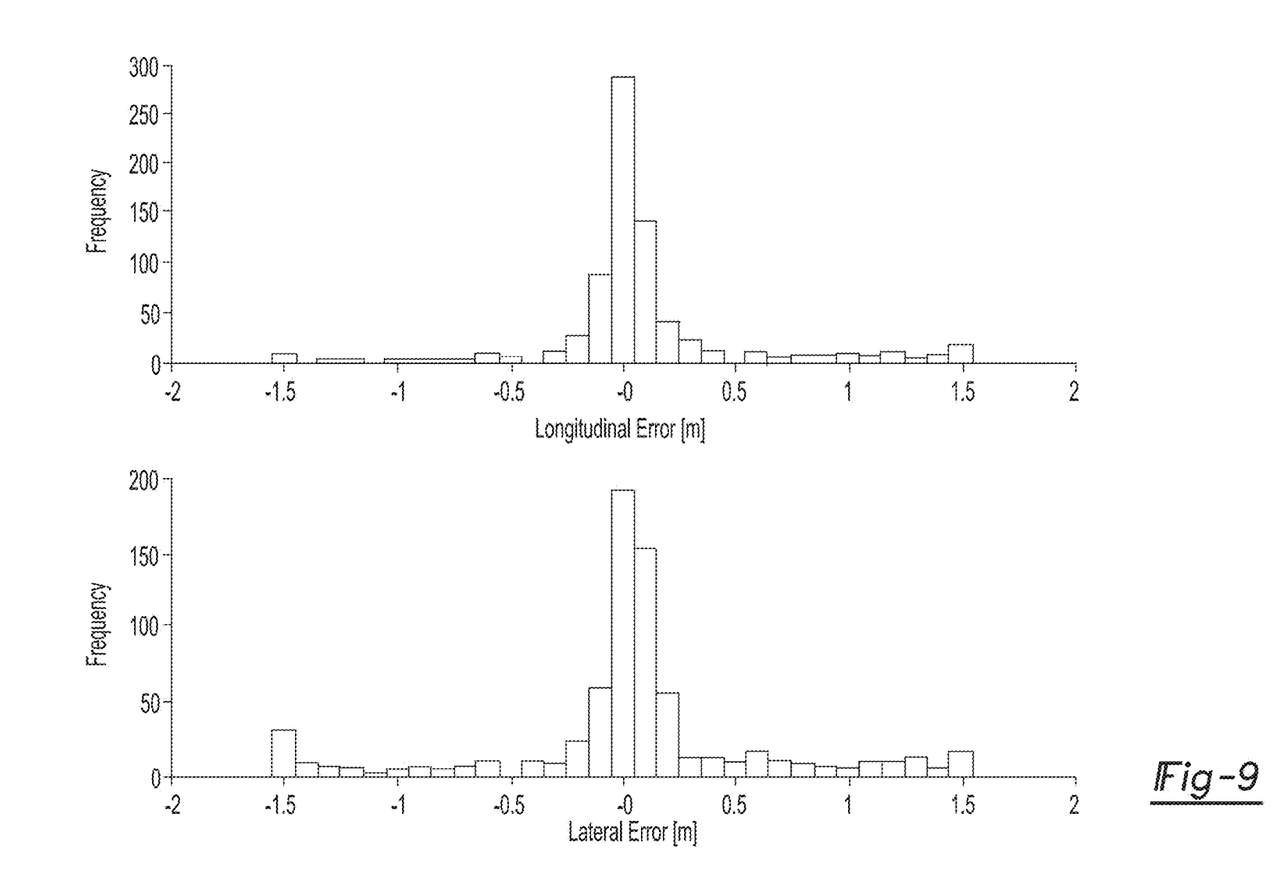
FIG. 9 are histograms of longitudinal and lateral errors.

Second, we show the same results in histogram form, as can be seen in FIG. 9, where we see that our registration is primarily concentrated within ±30 cm of our ground-truth. A common mode can be found in the tails of the histograms. This is caused by areas that are visually feature poor or obstructed by significant obstacles; for example, lane markings can often be perceived by the survey vehicle's LIDAR scanners and captured in our prior map, yet the subtle transition between pavement and faded lane markings cannot be observed by our camera. In these scenarios, the optimal normalized mutual information will try to pull the registration toward the edges of our prior map—the edges are often feature poor as well, and this alignment minimizes the joint entropy of the two signals.

Figure 7A:
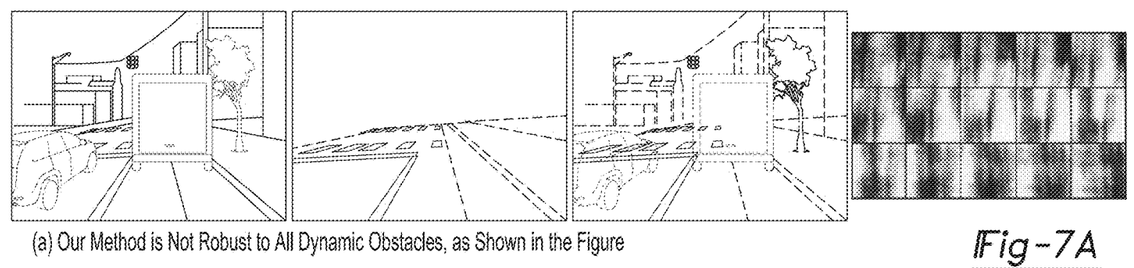
FIGS. 7A-7C are failure modes of image registration.
Figure 7B:
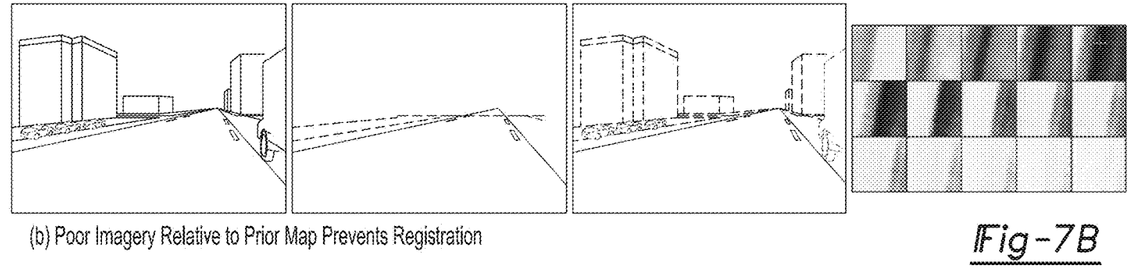
Figure 7C:
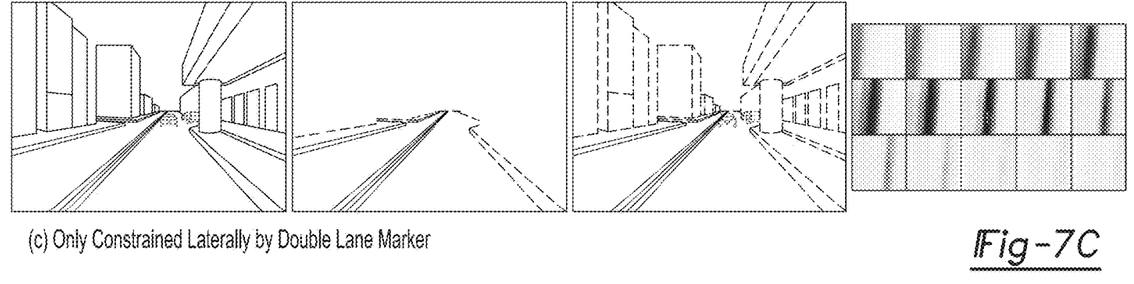

Finally, we present several scenarios of our image registration succeeding (FIG. 6) and common causes of failure (FIG. 7). These figures were generated by exploring within a local window around known ground truth.

B. Filtered Localization

We next looked at filtered response of our system that incorporates the projective image registration into an EKF localization framework. Moreover, we compare our localization performance against our own implementation of the state-of-the-art LIDAR-based localization proposed by Levinson et al. Our LIDAR-based localizer builds orthographic ground images using the four Velodyne HDL-32E's onboard; these orthographic ground images can then be aligned to an orthographic prior map built using an accumulation of these scans.

Figure 10A:
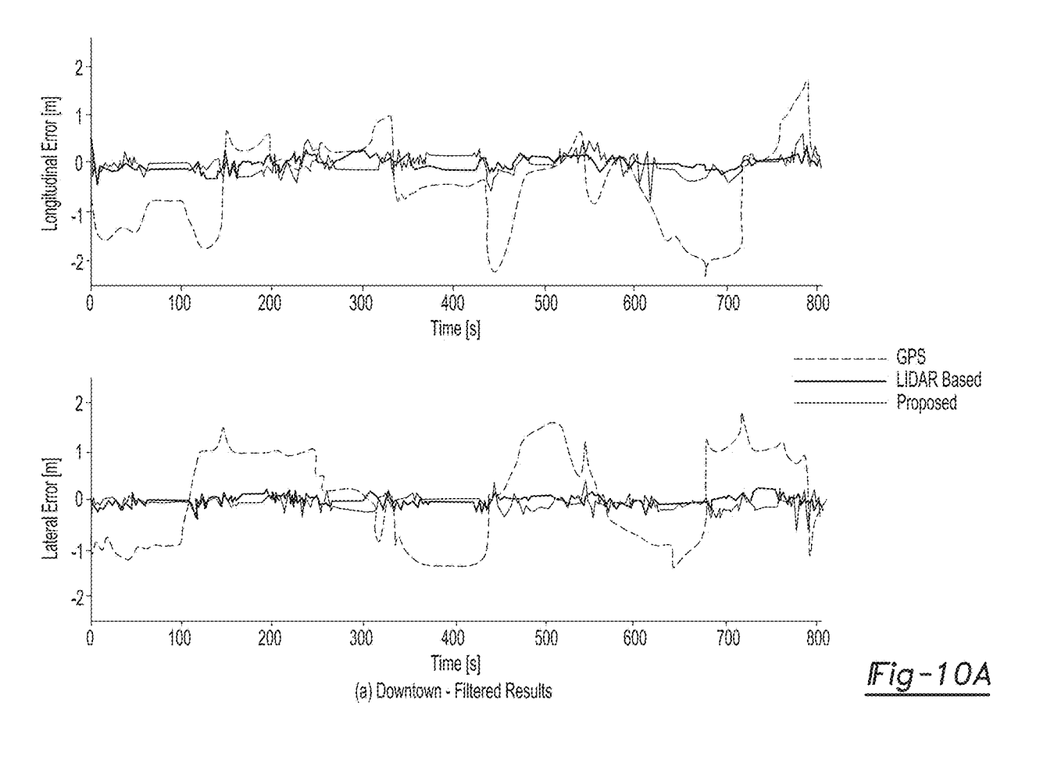
FIGS. 10A-10B show localization accuracy in terms of longitudinal and lateral error relative to SLAM-optimized ground-truth over time.
Figure 10B:
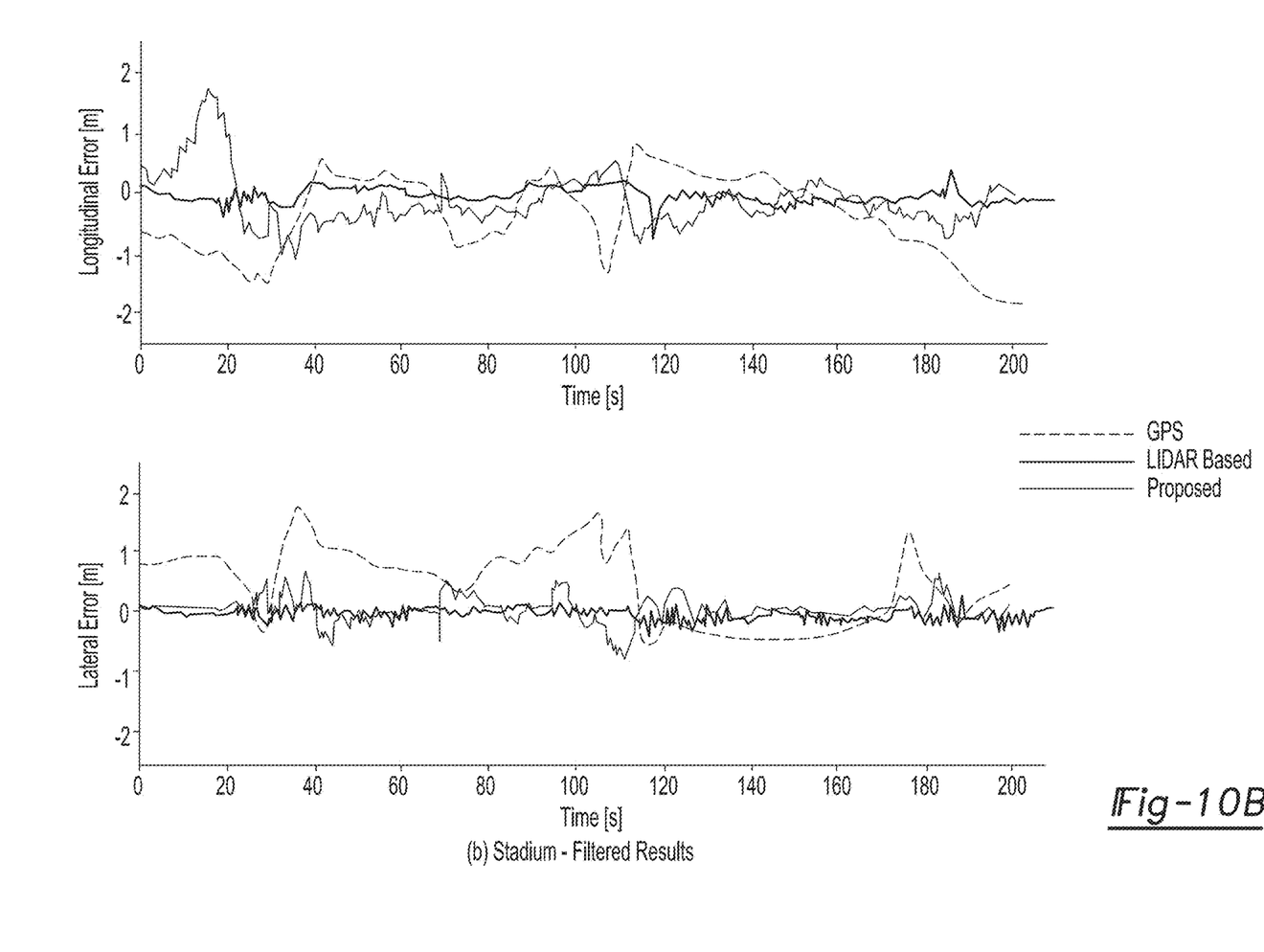

We present longitudinal and lateral errors over time for GPS, LIDAR-based localization, and our proposed single camera algorithm within the Downtown and Stadium datasets (see FIG. 10). Our proposed solution is able to maintain error levels at a similar order of magnitude as the LIDAR-based options, while using a sensor that is several orders of magnitude cheaper.

Note that the Stadium results show a rather large variance in longitudinal error; this is because half of the dataset is through a parking lot containing little visual variation. Also, we are slow to initially converge longitudinally because the first 20 s of the run is on a two-lane road containing only a double, solid lane marker.

These results are also summarized in Table I. Here we show that we are able to achieve longitudinal and lateral root mean square (RMS) errors of 19.1 cm and 14.3 cm, respectively, on the Downtown dataset. Further, we obtain longitudinal and lateral RMS errors of 45.4 cm and 20.5 cm, respectively, on the Stadium dataset.

TABLE 1

Comparison of RMS errors for GPS, LIDAR-based localization, and our proposed vision-only localization. Our method is able to maintain sufficiently well localized for use in an automated vehicle.

|  | Downtown RMS Error | | Stadium RMS Error | |
| --- | --- | --- | --- | --- |
| Method | Longitudinal | Lateral | Longitudinal | Lateral |
| GPS | 91.0 cm | 100.5 cm | 81.7 cm | 73.4 cm |
| LIDAR-based | 12.4 cm | 8.0 cm | 14.3 cm | 10.9 cm |
| Proposed | 19.1 cm | 14.3 cm | 45.4 cm | 20.5 cm |

VII. CONCLUSION

In this patent disclosure, we showed that a single monocular camera can be used as an information source for visual localization in a 3D LIDAR map containing surface reflectivities. By maximizing normalized mutual information, we are able to register a video stream to our prior map. Our system is aided by a GPU implementation, leveraging OpenGL to generate synthetic views of the environment; this implementation is able to provide corrective positional updates at ~10 Hz. Moreover, we compared our algorithm against the state-of-the-art LIDAR-only automated vehicle localization, revealing that the present teachings can achieve a similar order of magnitude error rate, with a sensor that is several orders of magnitude cheaper.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of visual localization using a visual camera system, the method comprising:
   outputting real-time visual camera data from a visual camera system;
   accessing a database of LIDAR-generated prior map information and generating a synthetic image;
   comparing the synthetic image to the real-time visual camera data to determine corrected position data to determine a camera position based on the corrected position data;
   applying corrected navigation information of the camera based on the determined camera position; and
   producing the LIDAR-generated prior map information by extracting a ground-plane at each pose and draping an orthographic texture over a varying z-height map.

2. The method according to claim 1 wherein the visual camera system is a monocular camera system.

3. The method according to claim 1 wherein the LIDAR-generated prior map information is three-dimensional map information.

4. The method according to claim 1 wherein the LIDAR-generated prior map information comprises odometry and global positioning system prior constraints.

5. The method according to claim 1 wherein the LIDAR-generated prior map information is constrained to produce a near-planar graph.

6. The method according to claim 1 wherein the step of comparing the synthetic image to the real-time visual camera data to determine corrected position data to determine a camera position based on the corrected position data comprises:
   determining a relative offset; and
   aligning the LIDAR-generated prior map to the visual camera data.

7. The method according to claim 1 further comprising:
   receiving the real-time visual camera data via a graphics processing unit, said graphics processing unit performing the step of accessing a database of LIDAR-generated prior map information and generating a synthetic image.

* * * * *